United States Patent Office 3,514,499
Patented May 26, 1970

3,514,499
SULFUR VULCANIZABLE CONJUGATED DIENE ELASTOMERS CONTAINING MINOR AMOUNTS OF POLYETHER URETHANES
Charles S. Schollenberger, Hudson, and Floyd D. Stewart, Akron, Ohio, assignors to The B. F. Goodrich Company, New York, N.Y., a corporation of New York
No Drawing. Filed Sept. 1, 1967, Ser. No. 664,935
Int. Cl. C08g *41/04;* C08d *9/10*
U.S. Cl. 260—859                                    8 Claims

ABSTRACT OF THE DISCLOSURE

Compounds of unsaturated sulfur-vulcanizable elastomers are provided with enhanced cure or vulcanization rates by adding to such compounds a poly(etherurethane) prepared by reacting a poly(alkylene oxide) with a diisocyanate.

Background of the invention

In vulcanizing or curing unsaturated rubbers or elastomers with sulfur to develop optimum physical properties an accelerator for the reaction is required. The use of accelerators introduces many problems in that they are generally expensive, may result in cures which are difficult to control, and the resulting vulcanizates often have undesirable aging characteristics. Because of these and other problems compromise amounts of accelerators are employed to obtain some enhancement of cure without magnifying the problems attending the use of accelerators. Compounders of unsaturated sulfur-curable elastomers continually seek methods for enhancing the cure rate of such elastomers without undesirable side effects.

Summary of the invention

We have now found quite unexpectedly that when sulfur-vulcanizable unsaturated elastomer componds containing sulfur and an accelerator also contain small amounts of poly(ether-urethane)s, that the cure time is effectively reduced without apparent adverse consequences on the resulting vulcanizates. The exact function of the poly(etherurethane)s is not understood, that is, whether it activates the vulcanization accelerator or acts independently in some other manner in the complex reactions involved in vulcanization, but, regardless of the reason, when the poly(etherurethane) is used as a compounding ingredient the optimum cure time of the compounds is effectively reduced. Thus, additional acceleration of cure rate, or reduction of cure time is obtained without using larger amounts of accelerators, with the advantage that the faster curing compounds are cheaper, have less odor and better aging properties than compounds prepared with larger amounts of accelerator.

Detailed description

The sulfur-vulcanizable unsaturated rubbers and elastomers in which the poly(etherurethane)s are effective in enhancing cure rates usually contain one or more percent olefinic unsaturation. Such materials include, for example, homopolymers, copolymers and interpolymers of conjugated dienes, such as polybutadiene, polyisoprene, polychloroprene, natural rubber; copolymers of conjugated dienes containing 4 to 6 carbon atoms copolymerized with one or more other vinylidene compound containing the $CH_2=C<$ grouping, that is, containing a terminal methylene group attached by a double bond to a carbon atom. Typical of such well known copolymers are copolymers of butadiene and styrene, butadiene and acrylonitrile, butadiene and vinyl pyridine, butadiene and acrylic acid, butadiene and alkyl acrylate esters such as ethyl acrylate, butadiene and methacrylic acid, butadiene and esters of methacrylic acid such as methyl methacrylate, butadiene and chlorostyrene, butadiene and methyl vinyl ketone and the like, in each case preferably containing more than 50% copolymerized diene. Other sulfur-vulcanizable elastomers include unsaturated olefin polymers such as copolymers of isobutylene and isoprene; ethylene-propylene-diene elastomers, 1,6-hexadiene being typical, and the like. These polymers contain at least about one percent olefinic unsaturation.

The poly(etherurethane)s are reaction products of hydroxyl poly(alkylene oxide)s, (polyethers), and organic diisocyanates. The hydroxyl poly(alkylene oxide)s preferably are essentially linear hydroxyl-terminated compounds having ether linkages as the major noncarbon linkage joining carbon atoms. The molecular weight of the polyethers may vary between about 100 and 6000. Typical hydroxyl poly(alkylene oxide)s found useful include hydroxyl poly(methylene oxide)s such as hydroxyl poly(trimethylene oxide), hydroxyl poly(tetramethylene oxide), hydroxyl poly(hexamethylene oxide) and hydroxyl poly(ethylene oxide)s of the formula $$HO[(CH_2)_nO]_xH$$

wherein $n$ is a number from 2 to 6 and $x$ is an integer greater than 1; hydroxyl poly (1,2-propylene oxide)s; and polyethers prepared from mixed oxides as hydroxyl poly(ethylene-propylene oxide)s, hydroxyl poly(tetramethylene-ethylene oxide)s, all of which are generally included in the formula

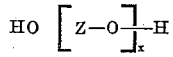

wherein Z is $(CH_2)_n$ and/or

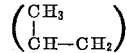

$n$ is 2 to 6 and $x$ is greater than 1.

The organic diisocyanates which are reacted with the polyethers will include, for example, both aliphatic and aromatic diisocyanates, although the aromatic diisocyanates generally result in polymers with a more desirable balance of properties. Such diisocyanates include for example, hexamethylene diisocyanate and the more desirable aromatic diisocyanates include naphthalene-1,5-diisocyanate, diphenyl methane-p,p'-diisocyanate, m-tolylene diisocyanate, p-phenylene diisocyanate, dichlorodiphenyl methane diisocyanate, dimethyldiphenyl methane diisocyanate, dibenzyl diisocyanate, diphenyl ether diisocyanates, bitolylene diisocyanates and the like. A particularly useful group of diisocyanates are those of the formula

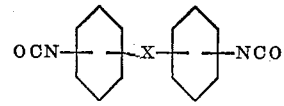

wherein X may be a valence bond; an alkylene radical containing 1 to 5 carbon atoms; NR where R is an alkyl radical; oxygen; sulfur; sulfoxide; sulfone and the like.

The ratio of reactants may be varied from as low as one-half to one or more mol of organic diisocyanate per mol of polyether; however, better results are generally obtained when the molar ratio of organic diisocyanate to polyether is from about 0.8 to less than 1.1 mols of organic diisocyanate per mol of polyether. Even better results are obtained when the ratio of organic diisocyanate to polyether is essentially 1:1 molar equivalents so that there is no substantial excess of organic diisocyanate, which in some applications may be less desirable than those poly(etherurethane)s prepared from essentially molar equivalents of reactants.

A particular preferred class of poly(etherurethane)s are prepared from the polyether, organic diisocyanate and another difunctional compound containing at least two active hydrogens. Such materials include diols, diamines, aminediols and the like, which normally will contain from about 2 to 12 carbon atoms. Examples of such materials include ethylene glycol, 1,3-propanediol, 1,2-propylene glycol, 1,4-butanediol, 1,3-butylene glycol, pentamethylene glycol, neopentyl glycol, decamethylene glycol, 1,4-bis($\beta$-hydroxyethoxy)benzene, meta- and para-xylylene glycol, 2-methyl-2-nitro-1,3-propanediol, 3-chloro-1,2-propanediol, ethylene diamine, 1,4-butylene diamine, aminoethanol, mixtures and the like. Diols of the formula $HO(CH_2)_nOH$ wherein $n$ is a number from 2 to 6 are useful materials.

When a third reaction component is used with the polyether and organic diisocyanate, the ratio of reactants may be varied from about 0.5 to 12 mols of the reactive third component per mol of polyether with about one to 13 mols of diisocyanate. Improvement in cure acceleration has been obtained with poly(etherurethane)s prepared with molar amount of diisocyanate from over one-half molar equivalent to substantially equivalent to the total molar amount of polyether and other polyfunctional reactants. Excellent poly(etherurethane)s have been obtained with molar ratios of one mol of polyether, 1 to 5 mols of a glycol and 2 to 6 mols of an organic diisocyanate in ratios so that there is essentially no free unreacted isocyanate groups remaining in the polymer. While equimolar reactant ratios or less diisocyanate are preferred, a slight excess, preferably less than 10% of organic diisocyanate may be used.

The poly(etherurethane)s are normally prepared under essentially anhydrous conditions with dry reactants. In preparing the poly(etherurethane)s of the examples, a standard procedure was followed. The specified molar ratio of polyether, and third reactant if used, was heated as melt in a reactor and stirred at a pressure of 5 to 6 millimeters at 100 to 110° C. to remove any moisture. To this mixture there was then added the organic diisocyanate, and after stirring to obtain complete mixing the mixture was poured into a silicone-coated container which was sealed and heated to 140° C. for about 3 hours. Reaction temperatures between about 100 to 150° C. have been employed with equivalent longer reaction times at the lower temperatures. When a glycol or other third difunctional reactant is employed it may be first mixed with the polyether, added at the same time as the organic diisocyanate, or added after the organic diisocyanate has reacted with the polyether.

The amount of poly(etherurethane) employed may be varied from about greater than 0.1 to 10 or more parts per 100 parts by weight of unsaturated sulfur-vulcanizable elastomer. While some enhancement of cure rate is noted with as little as 0.1 part, normally more than 0.1 part would be used to obtain an effective enhancement of cure rate. Within the range of about 0.5 to about 3 parts of poly(etherurethane), substantial increase in cure rates is noted. While amounts as large as 5, 10 or more parts of poly(etherurethane) may be used, such large amounts are not essential to obtain enhancement of cure rate. The poly(etherurethane)s should have a molecular weight greater than about 400, preferably greater than 700; and preferably are substantially linear, noncross-linked and soluble in dimethyl formamide.

The poly(etherurethane)s may be added to the sulfur-vulcanizable elastomers by any of the techniques well known to those skilled in the art. For example, the poly(etherurethane) may be formed as a water dispersion and mixed with a latex of the elastomer, which mixture is then coagulated to obtain an intimate mixture of the unsaturated elastomer and poly(etherurethane). The poly(etherurethane) may also be added by normal compounding procedures as on a mill, in an internal mixer as a Banbury, in a mixer-extruder and the like.

Compounds of the unsaturated vulcanizable elastomer may contain in addition to the poly(etherurethane) all of the known compounding ingredients including, for example, sulfur; inorganic oxides such as zinc oxide; accelerators; fillers, both reinforcing agents and fillers, including the carbon blacks, silica and the like; plasticizers; colorants; stabilizers including antioxidants, antiozonants and the like; lubricants; tackifiers; extends, etc. The poly(etherurethane)s are also added to oil-extended SBR, polybutadiene, cis-1,4-polyisoprene as well as carbon black masterbatches of these rubbers.

The amounts of sulfur used may be varied as is known by those skilled in the art form greater than 0.1 part per 100 parts by weight of rubber up to very large amounts used to make hard rubber. However, in providing vulcanized elastomers the amount of sulfur normally will be within the range of about 0.5 to less than about 5 parts, such as 3.

The accelerators used in the compounds normally are organic nitrogen or sulfur-containing compounds. Nitrogen-containing accelerators include, for example, aldehyde-ammonia compounds as hexamethylene tetramine, and acetaldehyde and other aldehyde reaction products with ammonia; the aliphatic amines and their condensation products as the reaction products of ethyl amine and formaldehyde, and the ethylene polyamines; aromatic nitroso compounds as p-nitrosodimethylaniline; condensation products of aniline or toluidine with aldehydes as acetaldehyde; guanidine derivatives as n,n'-diphenyl guanidine; the xanthates as sodium isopropyl xanthate; the dithiocarbamates as zinc dimethyl dithiocarbamate and other metal and alkyl carbamates; the thiuram sulfides as tetramethyl thiuram mono- and disulfide; heterocyclic compounds, particularly the mercaptobenzothiazoles, sulfenamides and the thiazyl disulfides and the like. Normally it is desired to use the smallest amount of accelerators consistent with the cure to be obtained, and the amounts of accelerator normally will be greater than about 0.1 up to about 4 or less parts per 100 weight parts of elastomer. It is one of the advantages of this invention that through the use of the poly(etherurethane), faster cure rates are obtained with this material, or the amount of accelerator may be decreased without a loss in cure time through the use of the poly(etherurethane) if this is desired.

The curing characteristics of the compounds in the following examples were obtained by means of a viscurometer in accordance with the article "The Viscurometer—An Instrument To Assess Processing Characteristics," A. E. Juve et al., Rubber World, December 1963, pages 43-49.

EXAMPLE I

Three poly(etherurethane)s were prepared as follows: Poly(etherurethane) A, by reacting one mol of tolylene diisocyanate (80% 2,4-tolylene diisocyanate/20% 2,6-tolylene diisocyanate) with one mol of poly(oxyethylene)glycol (molecular weight 601); poly(etherurethane) B by reacting two mols of diphenylmethane-p,p'-diisocyanate with a mixture of one mode of poly(oxyethylene)glycol (molecular weight 967) and one mol of ethylene glycol; poly(etherurethane) C by reacting two mols of tolylene diisocyanate (80% 2,4-tolylene diisocyanate/20% 2,6-tolylene diisocyanate) with one mol of poly(oxyethylene)glycol (molecular weight 1357) and one mol of 1,4-butanediol. In each of the following compounds there was added to 100 weight parts of SBR (23.5% bound styrene, Mooney 46–58, 4' ML at 212° F.) 3 parts of zinc oxide, 40 parts of ISAF carbon black, 1 part of diphenyl amine-acetone reaction product (BLE 25) antioxidant and 5 parts of naphthenic processing oil in a Banbury. 1.5 parts of sulfur and 2 parts of benzothiazyl disulfide accelerator were added on a mill. The amounts of poly(etherurethane) added, the optimum cure time, compression set, and stress strain properties of vulcanizates cured at 292° F. are set forth in Table I.

The increase in cure rate through the use of poly(etherurethane)s is evident from the data set forth above including improvement in compression set, and clearly demonstrates that the stress strain properties are not adversely affected by the presence of the poly(etherurethane).

TABLE I

| Compound | 1 | 2 | 3 | 4 | 5 | 6 | 7 |
|---|---|---|---|---|---|---|---|
| Poly(etherurethane) A | 0.5 | 1.0 | | | | | |
| Poly(etherurethane) B | | | 0.5 | 1.0 | | | |
| Poly(etherurethane) C | | | | | | 0.5 | 0.1 |
| Optimum cure, min | 54 | 31.3 | 24.6 | 35.2 | 29.1 | 28.9 | 22.5 |
| Compression set | 115 | 65 | 55 | 75 | 65 | 65 | 55 |
| Tensile strength, p.s.i | 3,550 | 3,530 | 3,835 | 3,560 | 3,450 | 3,910 | 3,865 |
| Elongation, percent | 455 | 455 | 475 | 445 | 450 | 475 | 480 |
| Modulus, p.s.i | 1,670 | 1,700 | 1,650 | 1,750 | 1,630 | 1,720 | 1,630 |

EXAMPLE II

Another series of compounds was prepared using the SBR of Example I and varying amounts of the poly(etherurethane) prepared by reacting together 4 mols of 80/20 tolylene diisocyanate, 1 mol of poly(oxyethylene) glycol and 3 mols of 1,4-butanediol. On a mill, at 122° F. there were added to 100 weight parts of SBR, in the following order, the hereinafter indicated amounts of poly(etherurethane), 3 parts of zinc oxide, 40 parts of ISAF carbon black, 1.5 parts of lauric acid, 5 parts of napthenic processing oil, 1.2 parts of sulfur and 2.0 parts of Santocure (N-cyclohexyl-2-benzothiazyl sulfenamide). Four compounds were prepared: A control, one with one part of poly(etherurethane), one with 5 parts of poly(etherurethane) and one with 10 parts poly(etherurethane). The optimum cure time in minutes was determined in the viscurometer and the values obtained were: For the control (no poly(etherurethane)) 22 minutes, one part of poly(etherurethane) 12.4 minutes, 5 parts poly(etherurethane) 9.9 minutes and 10 parts poly(etherurethane) 11.8 minutes.

EXAMPLE III

In this example the acceleration of the cure rates of polybutadiene and polyisoprene are demonstrated. To 100 weight parts of the rubbers 3 parts of zinc oxide, 40 parts of carbon black, 5 parts of naphthenic processing oil, 1 part of BLE–25 antioxidant, 0.75 part of Santocure and 0.75 part of sulfur were added. Varying amounts of a poly(etherurethane) prepared by reacting two mols of tolylene diisocyanate with a mixture of one mol of poly(oxyethylene)glycol and one mol of 1,4-butanediol were also added to the rubbers. Table II below sets forth the amounts added and the optimum cures obtained. Optimum cure time was determined in the viscurometer at 293° F.

TABLE II

| Compounds | Cis-1,4-polybutadiene | Cis-1,4-polyisoprene | Poly(etherurethane) parts | Optimum cure time, min. |
|---|---|---|---|---|
| 1 | 100 | | 0 | 22.7 |
| 2 | 100 | | 0.5 | 16.0 |
| 3 | 100 | | 1.0 | 12.4 |
| 4 | 100 | | 3.0 | 12.4 |
| 5 | | 100 | 0 | 18.8 |
| 6 | | 100 | 0.5 | 12.0 |
| 7 | | 100 | 1 | 11.6 |
| 8 | | 100 | 3 | 11.6 |

Compounds 2 and 6 above were repeated except the sulfur and Santocure were increased to 1.25 parts each, and in this case the optimum cure times were 5.8 and 6.0 minutes for these compounds.

When the above examples are repeated with nitrile and other unsaturated rubbers, and with other poly(etherurethane)s of the types disclosed herein, similar improvement in cure rates are obtained. These other poly(etherurethane)s can be prepared by reaction of the previously listed diisocyanates with polyethers, such as hydroxyl poly(tetramethylene oxide), substituted poly(ethylene oxides) and substituted poly(propylene oxides), wherein the substituent sidechain groups are alkyl radicals containing 1–3 carbon atoms, or phenyl radicals. These substituted polyethers include poly(ethyl ethylene oxide), poly(1,2-dimethyl ethylene oxide), poly(phenyl ethylene oxide) and poly(methyl-n-propylene oxide). These polyethers can be used alone, in additive mixtures, or as copolymers.

It will be obvious to those skilled in the art that such compounds of sulfur vulcanizable unsaturated elastomers with enhanced cure rates will find use in tires, wire coatings, mechanical goods, belts, and the like.

We claim:
1. A composition comprising a mixture of (1) an unsaturated sulfur-vulcanizable elastomer containing more than 50% of a conjugated diene of 4 to 6 carbon atoms and (2) a poly(etherurethane) of a hydroxyl poly(alkylene oxide) having a molecular weight between about 100 and 6000 of the formula $HO(CH_2)_nO_xH$ wherein $n$ is a number from 2 to 6 and $x$ is an integer greater than 1 and an organic diisocyanate, said poly(etherurethanes) being present in amount between about 0.1 to 10 parts per 100 parts of elastomer.

2. A composition of claim 1 wherein the poly(etherurethane) is a reaction product of poly(oxyethylene)glycol having a molecular weight from about 500 to about 2000 and a diisocyanate of the formula

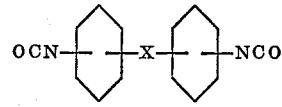

wherein X may be a valence bond or an alkylene radical containing 1 to 5 carbon atoms, and a diol of the formula $HO(CH_2)_nOH$ wherein $n$ is a number from 2 to 6, in a molar ratio of one mol of poly(oxyethylene)glycol, 1 to 5 mols of said second diol, and 2 to 6 mols of diisocyanate in substantially equimolar ratios of diisocyanate to glycol and diol, said poly(etherurethane) present in amount from about 0.5 to less than 3 parts.

3. A composition of claim 2 wherein the elastomer is polybutadiene.

4. A composition of claim 2 wherein the elastomer is polyisoprene.

5. A composition of claim 2 wherein the elastomer is a styrene-butadiene rubber.

6. A composition of claim 1 containing sulfur and an accelerator.

7. The composition of claim 6 containing sulfur and an organic accelerator.

8. The composition of claim 6 in a vulcanized state.

References Cited

UNITED STATES PATENTS

| 2,877,212 | 3/1959 | Seligman | 260—859 |
| 2,904,535 | 9/1959 | Mika | 260—859 |
| 2,948,707 | 8/1960 | Benning | 260—859 |
| 3,134,745 | 5/1964 | Dennis | 260—859 |
| 3,427,366 | 2/1969 | Verdol | 260—859 |

OTHER REFERENCES

Defensive Publication 857 O.G. 1039 (651,659) Merkel Date relied upon July 7, 1967. Published Dec. 24, 1968.

SAMUEL H. BLECH, Primary Examiner

P. LIEBERMAN, Assistant Examiner

U.S. Cl. X.R.

260—3, 41, 45, 45.9, 77.5

PO-1050
(5/69)

UNITED STATES PATENT OFFICE
CERTIFICATE OF CORRECTION

Patent No. 3,514,499          Dated May 26, 1970

Inventor(s) Charles S. Schollenberger/Floyd D. Stewart

It is certified that error appears in the above-identified patent and that said Letters Patent are hereby corrected as shown below:

Column 1, line 36, "componds" should read ---compounds---.

Column 2, line 47, "dibenzyl" should read ---bibenzyl---.

Column 4, line 6, "extends" should read ---extenders---; line 57, "mode" should read ---mole---; line 75, delete the word "above".

Column 5, line 1, delete "including improvement in compression set,"; in Table I, opposite "Poly(etherurethane) C", under Compound 7, "0.1" should read ---1.0---; in Table I, delete line 6 of the Table, "Compression set - 115, 65, 55, 75, 65, 65, and 55".

Column 6, Claim 1, line 6, the formula should read ---$HO[(CH_2)_nO]_xH$---.

Signed and sealed this 3rd day of July 1973.

(SEAL)
Attest:

EDWARD M. FLETCHER, JR.
Attesting Officer

Rene Tegtmeyer
Acting Commissioner of Patents